United States Patent Office 3,507,481
Patented Apr. 21, 1970

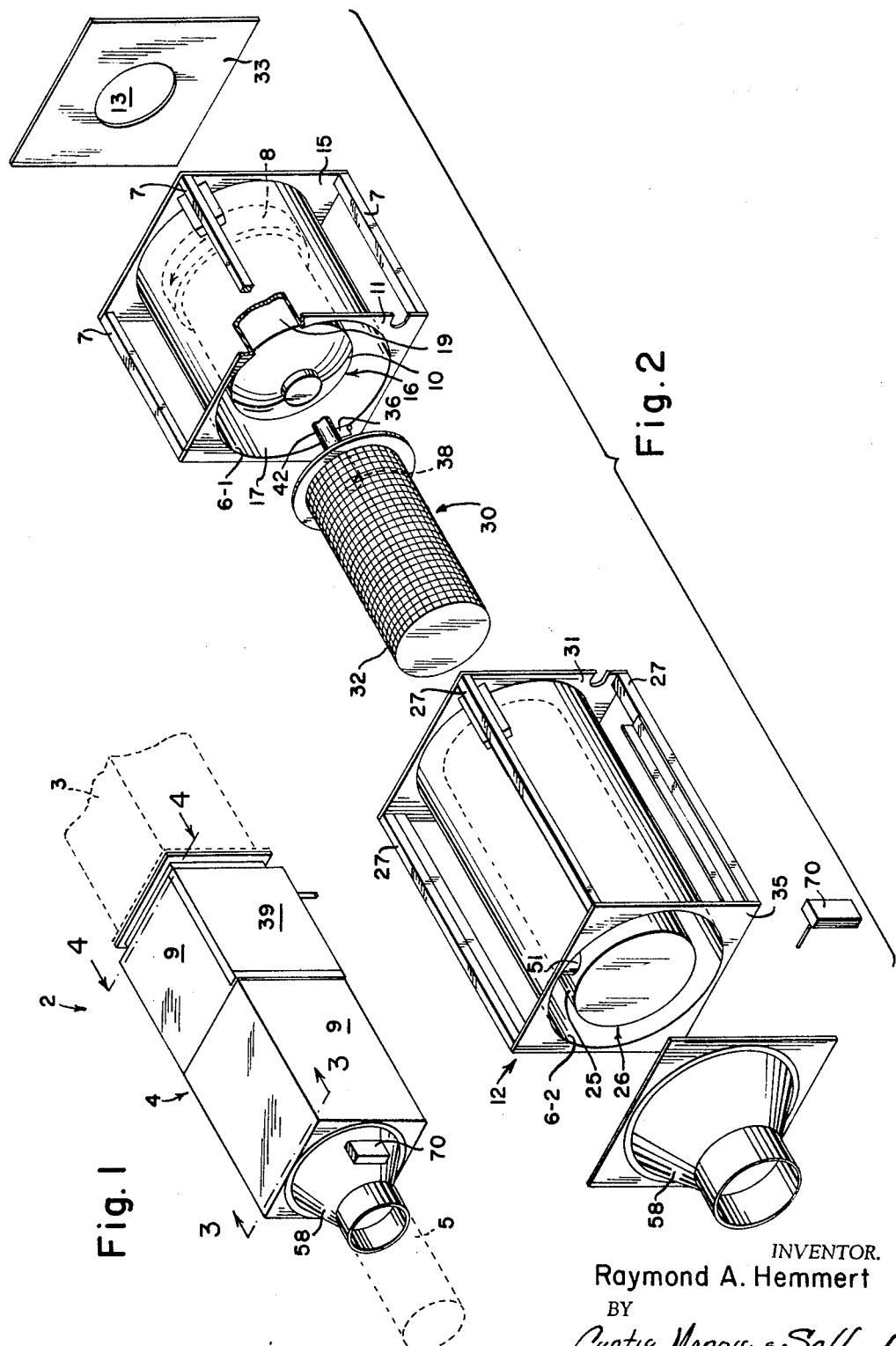

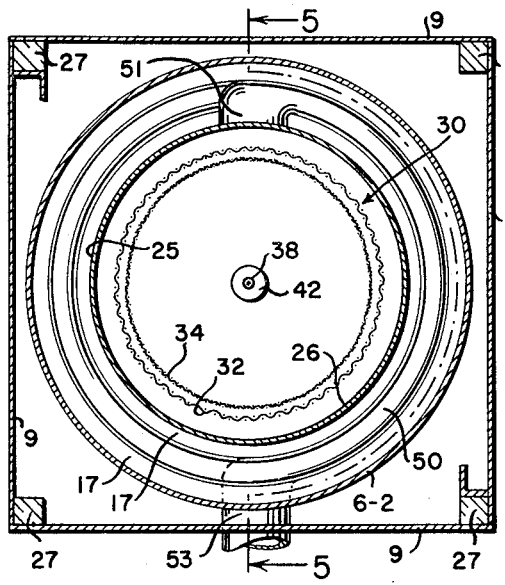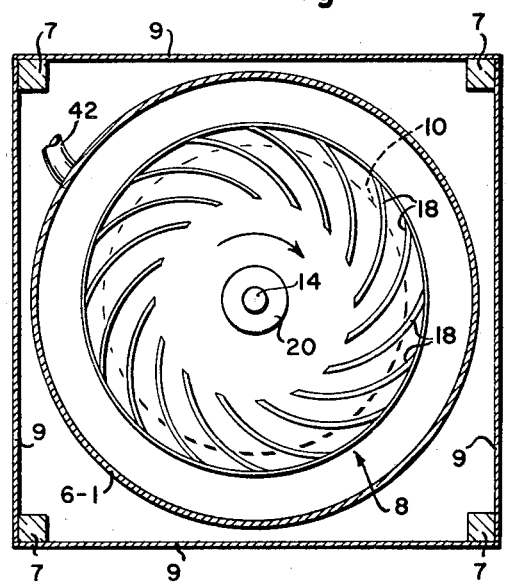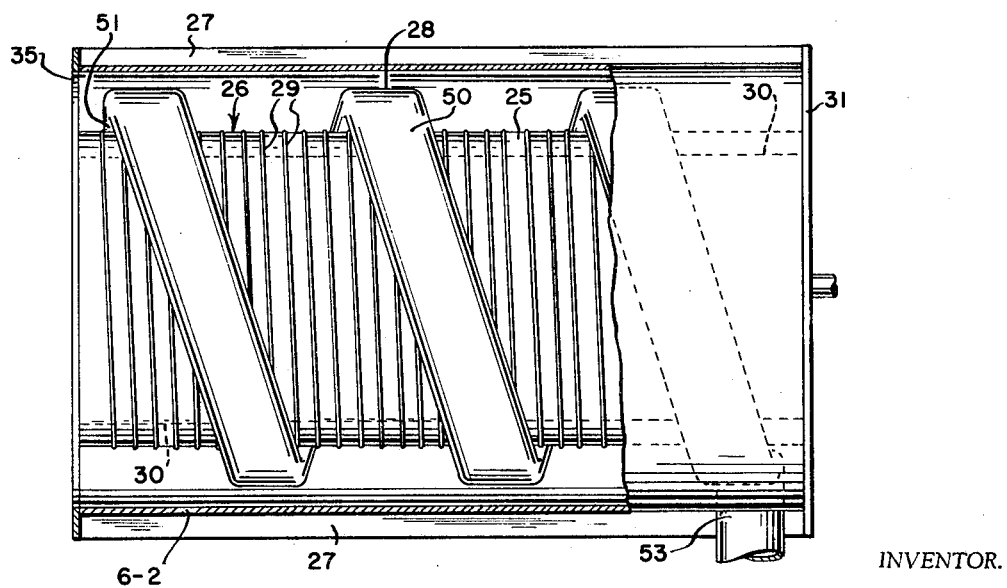

3,507,481
WARM AIR FURNACE WITH RADIANT BURNER
Raymond A. Hemmert, Columbus, Ohio, assignor to Columbia Gas System Service Corporation, New York, N.Y., a corporation of Delaware
Filed Feb. 27, 1968, Ser. No. 708,691
Int. Cl. F24h 3/02
U.S. Cl. 263—20                               11 Claims

ABSTRACT OF THE DISCLOSURE

A compact or miniaturized furnace is disclosed having very compact blower or fan and heating sections. A stream of air to be heated is drawn into an end of an elongated casing and is directed radially outwardly and thence longitudinally to the casing through an annular passageway which extends through the heating zone. Within the heating zone the air passes along the outside of the cylindrical primary heating surface and the air also passes around a spiral tubular flue for the exhaust or furnace gases. The primary heating surface receives heat from an infrared radiant burner enclosed within the cylindrical wall and the exhaust gases flow through the spiral flue in countercurrent relationship to the direction of flow of the air being heated.

---

This invention relates to furnaces, and more in particular to radiant gas-burning furnaces for heating moving air.

An object of this invention is to provide a furnace which is highly efficient, compact, and capable of transferring a large quantity of heat to the air stream.

A further object is to provide such a furnace that is capable of operating in various positions relative to the horizontal.

A further object is to provide such a furnace that can be adapted to provide a wide range of heat production and transfer levels and to burn a wide range of fuel and air mixtures efficiently.

A still further object is to provide such a furnace that does not permit the development of objectionable hot areas on the heating surfaces, and that delivers a stream of air which is fully mixed and even in temperature.

A still further object is to provide such a furnace that reduces the loss of heat through the walls of the furnace without the use of heavy insulation.

These and other objects will be in part obvious and in part pointed out below.

It is often desirable to provide forced-air heating systems whose furnaces and ducts take up very little space. In such compact or miniaturized systems, it is necessary that heat be transferred to a swiftly flowing stream of air at a rapid rate. In devices that have been heretofore developed, the rapid combustion of gas that is necessary to produce heat at the high rates required has resulted in undesirable characteristics, including high noise levels. The present invention overcomes this and other disadvantages of conventional prior art arrangements. In the illustrative embodiment, a cylindrical gas-fired radiant heater is provided from which heat is transferred directly to a cylindrical wall which surrounds it, and the air being heated flows longitudinally along the outside surface of the cylindrical wall. The flue gases are discharged through a spiral tubular flue which surrounds the cylindrical wall in the path of the flowing air so that the air is also heated by the flue gases.

In the drawings:

FIGURE 1 is a perspective view of one embodiment of the invention;

FIGURE 2 is an exploded view of the unit of FIGURE 1 with parts broken away;

FIGURES 3 and 4 are vertical sections, respectively, on the lines 3—3 and 4—4 of FIGURE 1 and showing the structure which is exposed by the removal of the vertical end walls at the opposite ends of the casing; and FIGURE 5 is a vertical section on the line 5—5 of FIGURE 3.

Referring to FIGURE 1 of the drawings, the furnace 2 has an elongated outer casing 4 which is substantially square in cross-section and through which there is a passageway for the air being heated from an air return or cold-air duct 3 to a heated-air discharge duct 5. A sheet metal cylinder 6 is mounted centrally within casing 4, and concentrically positioned within cylinder 6 are: a centrifugal blower 8, an electric motor 16 which drives the blower and has a cylindrical housing 10, and a heating section or unit 12. Sheet metal cylinder 6 is in two sections, 6-1 surrounding the blower and motor, and 6-2 surrounding the heating unit 12. The portion of casing 1 surrounding cylinder section 6-1 is formed by four horizontal corner frame members 7, rectangular metal walls 9 which form the sides and the top and bottom walls, and end plates 11 and 15 positioned at the ends of cylinder section 6-1 and providing support for the cylinder section. Each of the end plates is square with a round opening concentric with the blower and cylinder axis, so that air may flow to the blower and from the cylinder section. The motor and blower are supported from the bottom of cylinder section 6-1 by mounting brackets which are not shown in the drawings. The section of casing 4 which encloses the heater unit 12 is of similar construction with corner frame members 27, the side walls 9 which extend the length of the casing, and end plates 31 and 35 which provide support for cylinder section 6-2.

Blower 8 is mounted on the shaft 14 of motor 16 and has backward curved blades which are rigidly mounted between a solid circular backplate and a front annular shroud ring. A cylindrical hub 20, approximately 2 inches in diameter, is concentrically and rigidly attached to the circular backplate, and mounted on and keyed to the motor shaft. Motor 16 drives the blower in the direction of the arrows so that the air is discharged radially toward cylinder 6-1 and thence axially along passageway 17. Illustratively, the blower has sixteen blades, extending only between the inner and outer edges of an associated shroud ring annulus, and turns at a speed of the order of 3450 revolutions per minute. The air from duct 3 flows axially through a restricted circular opening 13 in the inlet adapter plate 33 into the center of the blower wheel. The air is then directed radially outward through the blower wheel and discharged into the annular passageway 17 between the outer surface 19 of motor housing 10 and cylinder section 6-1. Blades 18 extend radially outwardly beyond surface 19. The discharge arrangement for the air creates air pressure and flow conditions which cause the air to move axially along passageway 17 in a quantitatively uniform annular pattern.

Heating unit 12 has a sheet metal cylinder 26, the outer surface 25 of which is the primary heating surface for the air flowing through the annular passageway 17, and cylinder 26 has turbulators 29 formed by wrapping iron wire at ½ inch spiral spacings around surface 25 which provide air turbulence, thus improving the rate of heat transfer.

Positioned concentrically within cylinder 26 (see FIGURES 3 and 5) is a cylindrical infrared radiant burner 30 composed of three layers of fine mesh wire cloth 34, a large mesh reradiating screen 32 and a gas discharge nozzle 38. Gas is supplied to nozzle 38 through a pipe or tube 36 and a control system 39, which includes conventional gas train and appropriate controls. The desired amount of air is supplied to burner 30 from passageway 17 through an opening 42 under the pressure of blower 8. The air passes into the central chamber of the burner with the gas and mixes therewith and that mixture flows outwardly through the wire mesh cylinders. The burner produces uniform infraredradiation, and can achieve a very high rate of combustion without the high levels of flame noise that accompany rapid combustion and heat transfer in some types of burners. Furthermore, this burner permits the use of a wide range of mixtures of gas and air, so that the rate of heat production and transfer can be adjusted and controlled. The radiant burner has ignition means of known construction and arrangement. When ignited, the burner produces radiant heat throughout its outer cylindrical wall, which heat is radiated to cylinder 26, and the cylinder is also heated by convection along the inner surface by the flue gases flowing from the burner.

The flue gases are discharged from cylinder 26 through steel spiral tubular flue 50 which has its flue gas receiving end 51 connected to an opening in cylinder 26 at the downstream side of the air passageway 17. Flue 50 is somewhat oval in cross-section and is positioned centrally of the passageway 17 with the minor axis of the oval cross-section of the flue parallel to the thickness or radial dimension of the passageway. Hence, the major dimension of the oval and the greater portion surface 28 of the flue is somewhat parallel to the direction of air flow. Tube or flue 50 has its discharge end 53 at the upstream end with respect to the direction of air flow in passageway 17. Hence, the flue gases pass through the flue along the spiral path in counterflow relationship to the stream of air being heated, so that the flue provides very satisfactory additional or secondary heat transfer of heat to the air.

In this embodiment, the outer mesh cylinder 32 is of coarse mesh an dhas a diameter of 7$^{13}$/$_{16}$ inches, and the inner mesh cylinder 34 consists of three layers of very fine mesh and has a diameter of 7¼ inches. The diameter of cylinder 26 is 9⅛ inches and the diameter of cylinder 6 is 13 inches. Hence, passageway 17 has a radial dimension of 1$^{15}$/$_{16}$ inches. Flue 50 is a flattened tube having an original diameter of 2 inches and its cross-section is an oval with a minimum dimension of ⅞ inch and a maximum dimension of 2⅝ inches. As indicated above, the major dimension of 2⅝ inches extends generally in the direction of the stream of air being heated so that the broad side walls of the flattened tube provide good heat transfer between the flue gases and the air. The minimum dimension of the flue, which is ⅞ inch, is in general alignment with the transverse thickness or radial dimension of the passageway 17, which is 1$^{15}$/$_{16}$ inches. Hence, there is a passageway of slightly more than ½ inch at each side of the flue, i.e., respectively between the flue and the cylinders 26 and 6.

It has been indicated above that blades 18 of blower 8 overhang the inner radius of passageway 17, i.e., the blades extend radially outwardly beyond the motor housing 10. In this embodiment, blower 18 has an outer diameter of 10¼ inches so that it overhangs 1⅞ inches beyond the 6½ inch diameter motor housing. The air discharge characteristics of the blower provide efficient discharge of the air in the annular stream through passageway 17. Motor 16 is cooled directly by the flowing air in passageway 17.

In this embodiment the outer casing 4 is 14½ inches high and wide, and it is in the order of 30 inches long. The controls for the burner are mounted in casing 4 in the blower section between the casing wall and cylinder 6. The temperature of the air passing into duct 5 is sensed by a temperature limit control 70.

A summary of the mode of operation is as follows: Return air enters the furnace at the center of blower 8 and is moved outwardly along blades 18 by centrifugal force toward the inner surface of cylinder 6, which diverts the flow of the air to a longitudinal direction, parallel to the axis of the cylinder. As the air stream leaves the spaces between the ends of blades 18 and cylinder 6, it flows evenly along passageway 17 between motor housing 10 and cylinder 6. When the air reaches the heating portion of the furnace, it is heated by both the primary heating surface 25 of cylinder 26 and the secondary heating surface 28 of flue 50. The evenness and uniformity of the air stream prevents the formation of objectionably overheated areas on either of the heating surfaces. Because of the geometrical configuration of the primary and secondary heat exchanger surfaces, the temperature of the air stream is highest adjacent cylinder 26 and is lowest adjacent the wall of cylinder 6. For this reason, little heat is transferred from the air to cylinder 6, and there is little need to provide insulation between it and casing 4. Outlet air adapter 58 transforms the annulus of moving air to a "solid" cylindrical stream. The air is mixed as it flows so that it is of uniform temperature throughout prior to reaching the first air outlet from the distribution conduit.

What is claimed is:

1. A warm air furnace comprising a blower section and a heating section, said sections having wall means defining a substantially annular passageway for the flow of air through said blower section and thence through said heater section with there being air receiving and air discharge openings substantially in alignment with said axis, said blower section having a blower mounted adjacent said air receiving opening and an electric motor driving said blower and positioned along said axis, said wall means within said blower section presenting substantially cylindrical and coextensive passageway surfaces which surround said motor and said blower being adapted to deliver air to said passageway with the air flowing axially therefrom, said heating section being defined by an outer cylindrical surface and a parallel inner surface which constitutes a primary air-heating surface and is the outer surface of a heat transmitting cylinder, said heater section including a radiant heater positioned concentrically within said heat transmitting cylinder to transmit heat thereto.

2. A furnace as described in claim 1 which includes a heat transmitting flue connected to discharge the products of combustion from said heating element in heat exchange relationship with the stream of air being heated.

3. A furnace as described in claim 2 wherein said flue is a spiral sheet metal tube positioned within said annular passageway and extending around said heat transmitting cylinder and axially in the direction countercurrent to the air flow.

4. A furnace as described in claim 3 wherein said blower is of the centrifugal type with backward curved vanes from which air is discharged in an annular profile.

5. A furnace as described in claim 2 which includes means to deliver air from said blower to said burner.

6. A furnace as described in claim 1 wherein each of said sections is enclosed within a rectangular casing, and adapter means to direct the stream of air to and from the respective casings.

7. In a furnace construction, an air heating unit comprising, an outer casing, a gas burner centrally positioned within said casing, a heating shell surrounding said burner and providing a substantially cylindrical heat transmitting wall along which air passes to be heated, an outer wall spaced from said heat transmitting wall and forming an outer surface confining the stream of air to be heated to an air-flow passageway, a heat transmitting spiral flue connected to provide a discharge flue for the products of combustion of said burner and positioned spirally within said air-flow passageway whereby the air is heated simultaneously by contact with said heating surface and said flue, and means to direct a stream of air through said passageway.

8. Apparatus as described in claim 7 wherein said means to direct air comprises a blower which directs air under pressure through said passageway, and means to supply air from said blower to said burner.

9. Apparatus as described in claim 8 which includes control means for said burner, including means responsive to the temperature of the air passing from said passageway.

10. In a furnace construction, an air heating unit comprising, an outer casing, a gas burner centrally positioned within said casing, a heating shell surrounding said burner and providing an outer heat transmitting wall along which air passes to be heated, an outer wall spaced from and concentric with said heat transmitting wall and having an inner surface confining the stream of air to be heated to an air-flow passageway of substantially uniform cross-section, a heat transmitting spiral flue means connected to discharge the products of combustion of said burner and positioned spirally within said air-flow passageway whereby the air is heated simultaneously by contact with said heating surface and said flue means, and means to direct a stream of air through said passageway.

11. A warm air furnace comprising a blower section and a heating section, said sections having wall means defining a substantially annular passageway for the flow of air through said blower section and thence through said heater section with there being air receiving and air discharge openings substantially in alignment with said axis, said blower section having a blower mounted adjacent said air receiving opening and an electric motor driving said blower and positioned along said axis, said wall means within said blower section presenting substantially cylindrical and coextensive passageway surfaces which surround said motor and said blower being adapted to deliver air to said passageway with the air flowing axially therefrom, said heating section being defined by an outer cylindrical surface and a parallel inner surface which constitutes a primary air-heating surface and is the outer surface of a heat transmitting cylinder, said heater section including a radiant gas burner positioned concentrically within said heat transmitting cylinder to transmit heat thereto, and heat transmitting spiral flue means connected to provide a discharge flue for the products of combustion of said burner and positioned spirally around and adjacent said heat transmitting surface whereby the air is heated simultaneously by contact with said surface and said flue, and means to direct a stream of air through said passageway.

References Cited

UNITED STATES PATENTS 3,068,854    12/1962    Freeman.
3,010,449    11/1961    Owen.

JOHN J. CAMBY, Primary Examiner

U.S. Cl. X.R.

126—110